April 27, 1937.  S. D. HOVEY  2,078,851

HITCH

Filed Oct. 23, 1935

Smith D. Hovey
INVENTOR

BY Victor J. Evans & Co.
ATTORNEYS

Patented Apr. 27, 1937

2,078,851

UNITED STATES PATENT OFFICE 2,078,851

HITCH

Smith D. Hovey, Trenton, Nebr.

Application October 23, 1935, Serial No. 46,398

1 Claim. (Cl. 280—33.15)

This invention relates to hitches adapted for use in connection with various types of vehicles, farm implements and similar devices, and has for the primary object the provision of a practical, durable and efficient device of this character which may be manufactured and sold at low cost and is easily coupled and uncoupled and will permit freedom of turning movements between devices connected thereby and also permit desired up and down movements between devices and its construction is such as to prevent accidental uncoupling.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a hitch constructed in accordance with my invention.

Figure 1:
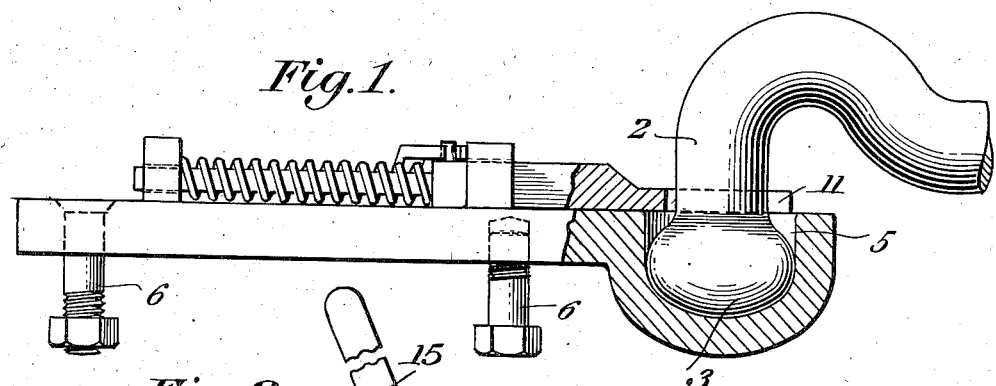
Figure 2:
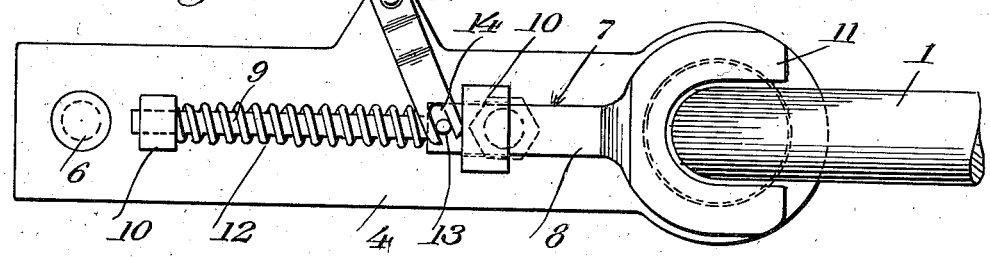
Figure 2 is a fragmentary top plan view illustrating the same.

Referring in detail to the drawing, the numeral 1 indicates a draw bar which may be secured in any suitable way to a trailer, farming implement or any other device to be towed and terminates in a goose neck 2 carrying at the free end thereof an enlargement 3 of substantially spherical shape.

Attached to the towing vehicle or similar device is a plate 4 enlarged and offset at one end to form a socket 5 to receive the end 3 of the draw bar. The plate 4 is secured to the towing vehicle by fasteners 6.

A latch mechanism 7 is carried by the plate and releasably secures the end 3 of the draw bar in the socket 5. The latch mechanism includes a bar 8 formed integrally with a stem 9. The bar 8 and stem 9 are slidably supported to the plate 4 by apertured lugs 10. The bar 8 is enlarged and bifurcated to form a forked portion 11 adapted to straddle the goose neck and overlie the mouth of the socket to retain in the socket the end 3 of the draw bar. A coil spring 12 is mounted on the stem 9 and bears against one of the lugs 10 and the end of the bar 8 for urging the forked end 11 into a position to overlie the mouth of the socket. A pin 13 is secured to the bar 8 and is engaged by the forked end 14 of a lever 15 pivoted to the plate, as shown at 16. A movement of the lever 15 in one direction draws the bar 8 away from the socket 5 against the action of the spring 12 so that the end 3 of the draw bar may be readily removed from the socket for uncoupling devices to which the hitch is applied. The draw bar or end 3 thereof when retained in the socket 5 by the forked end 11 of the bar 8 will be free to turn relative to the socket, as well as to have a limited up and down movement without danger of becoming uncoupled therefrom.

Figure 3:
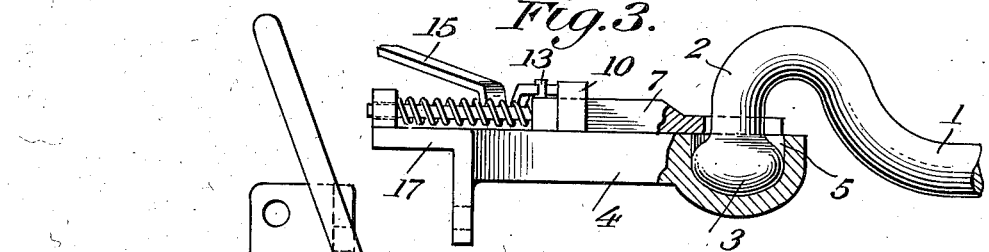
Figure 3 is a fragmentary side elevation, partly in section, showing a modified form of my invention.
Figure 4:
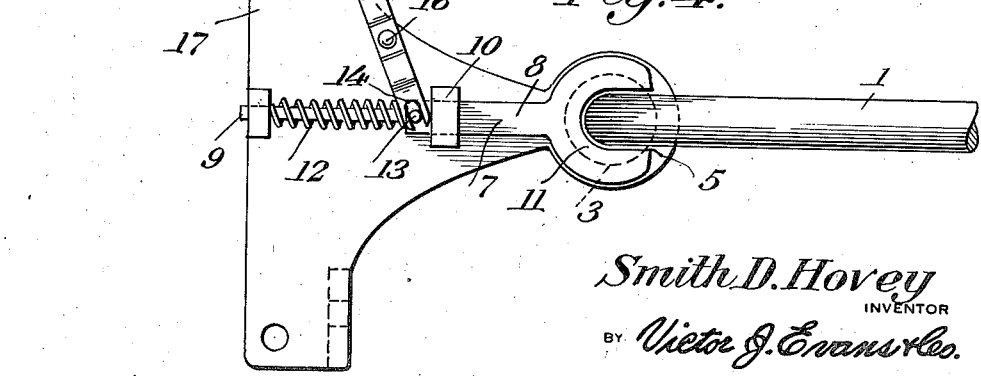
Figure 4 is a fragmentary top plan view illustrating the same.

The plate 4, as shown in Figures 3 and 4, may be enlarged and shaped to form an angle iron bracket 17, the angularly related portions thereof being apertured to receive fasteners to secure the bracket to a vehicle or similar device.

Having described the invention, I claim:

A hitch comprising an attaching plate having a socket opening outwardly through the upper face of said plate and formed at one end of the latter, a draw bar having a goose neck terminating in an enlarged end resting in said socket, spaced apertured lugs formed on the upper face of the plate, a forked locking member slidable through the lugs and adapted to straddle the goose neck above the enlarged end and partly overlying the mouth of the socket and having a reduced portion providing a shoulder, a coil spring mounted on the reduced portion of the locking member and bearing against one of the lugs and the shoulder to position the forked end of the locking member in said position, a pin secured to said locking member, an offset formed on one edge of the plate, and a lever pivoted to the offset laterally of the locking member and having one end forked to receive the pin whereby pivotal movement of the lever in one direction will retract the forked locking member from engagement with the goose neck and permit the enlarged end thereof to be lifted from the socket.

SMITH D. HOVEY.